Figure 1:
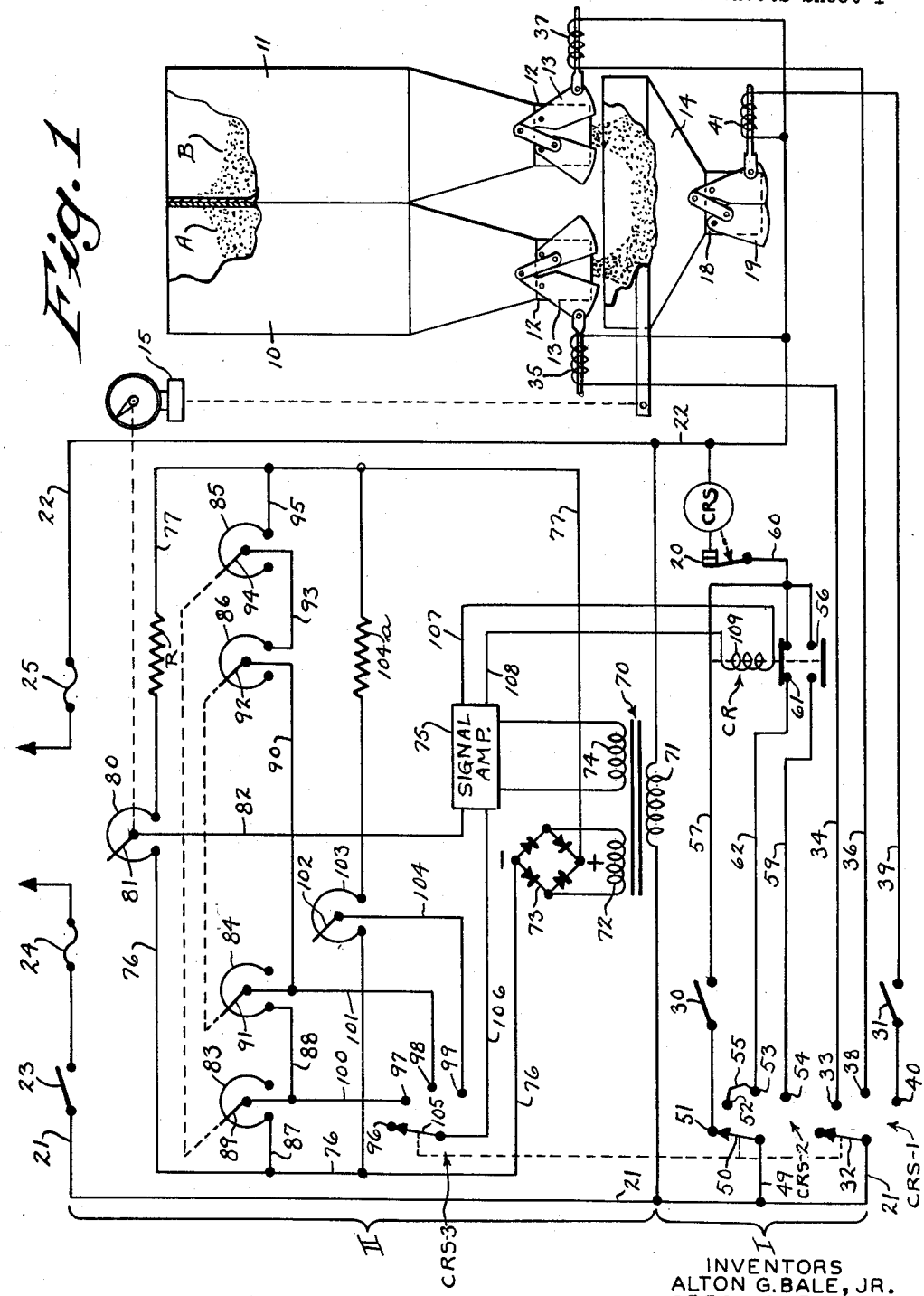

March 17, 1964  A. G. BALE, JR., ETAL  3,125,176
AUTOMATIC CONTROL FOR CUMULATIVE DELIVERY OF MATERIALS
Filed Jan. 8, 1960  3 Sheets-Sheet 1

INVENTORS
ALTON G. BALE, JR.
GREG F. TURNER
BY *Arnold J. Ericsen*
ATTORNEY

March 17, 1964  A. G. BALE, JR., ETAL  3,125,176
AUTOMATIC CONTROL FOR CUMULATIVE DELIVERY OF MATERIALS
Filed Jan. 8, 1960  3 Sheets-Sheet 2
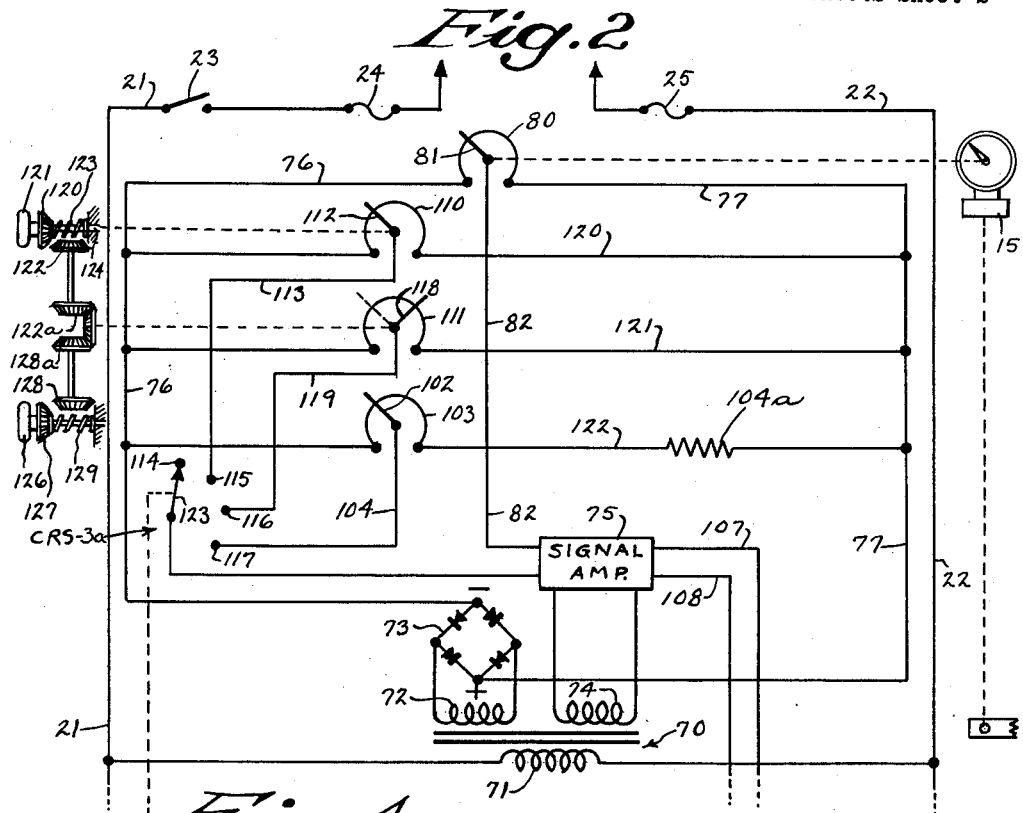
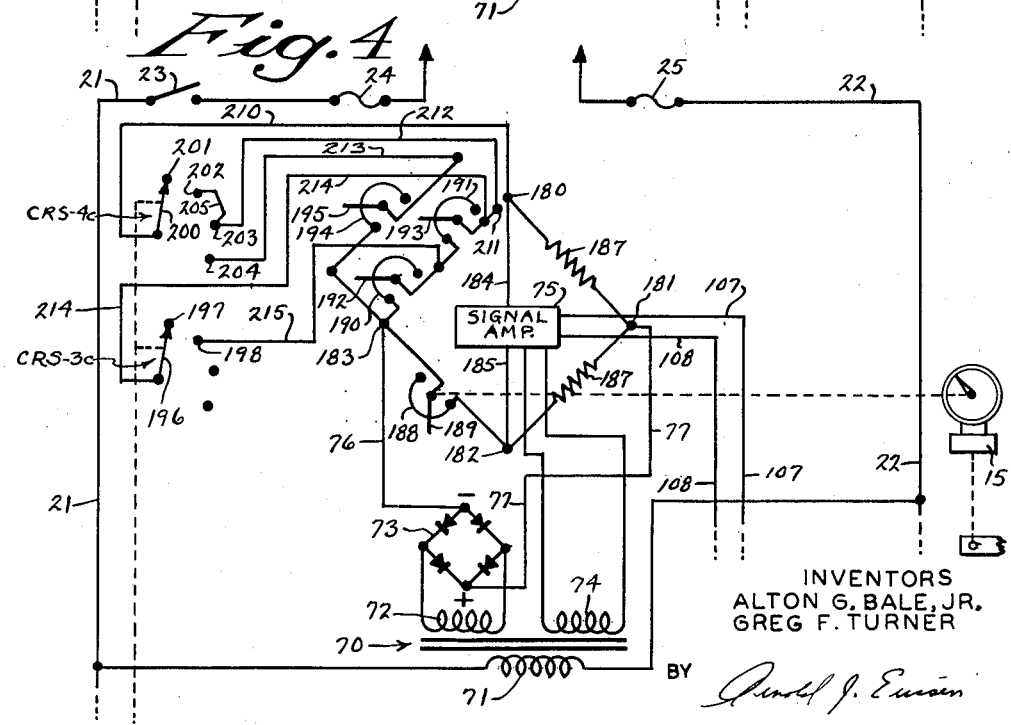
INVENTORS
ALTON G. BALE, JR.
GREG F. TURNER
BY
ATTORNEY

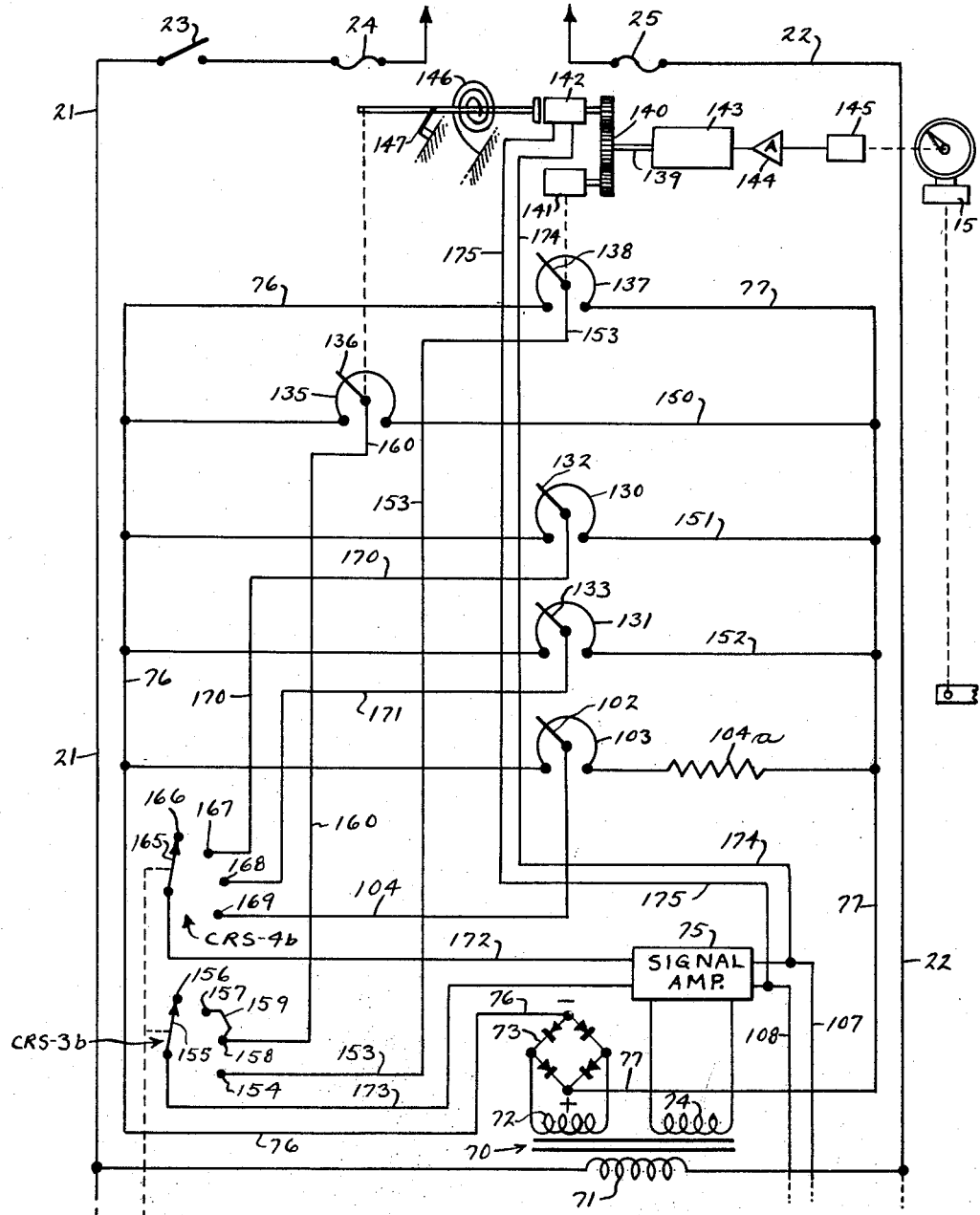

United States Patent Office 3,125,176
Patented Mar. 17, 1964

3,125,176
AUTOMATIC CONTROL FOR CUMULATIVE
DELIVERY OF MATERIALS
Alton G. Bale, Jr., South Milwaukee, and Greg F. Turner, Brookfield, Wis., assignors to Wisconsin Electrical Mfg. Co., Inc., Milwaukee, Wis., a corporation of Wisconsin
Filed Jan. 8, 1960, Ser. No. 1,276
5 Claims. (Cl. 177—80)

The present invention relates to an automatic control means for material delivery or positioning apparatus and particularly to an integrating sensing control circuit. The preferred circuit may take the form of a voltage divider circuit or of a bridging circuit, if desired, and in which circuits a signal amplifier may be preset to provide an amplified operating circuit to permit the motivation of controls for hopper batch gates or hopper discharge gates or for other means of discharging or positioning a selected material or commodity in which cumulative weights of the separate materials or the cumulative positions thereof may be automatically controlled without intermediate resetting operations, and wherein the separate material weights or movements thereof with respect to a fixed point may be individually set up on the control panel by means of a control knob registering on a dial directly related to each of the materials and preset according to the desired delivered weights or positions thereof.

It is an object of the present invention to provide an automatic cumulative weight or positioning control means for delivery of preselected amounts or conveyor positions relating to individual materials or commodities and in which an operator may cumulatively collect the materials in a hopper or at an established transportation or delivery point by means of individual and independent settings of simplified control panel dials, and without requiring the operator to mentally add the weights or relative transportation positions accumulating in a final cumulative weight or position.

It is another object of the present invention to provide, in various embodiments thereof, an automatic cumulative weight or positioning control means including a plurality of voltage dividing circuits which may be alternatively matched with one another to reflect a balanced or unbalanced condition to an amplifying device for control of the delivery of different materials accumulated at a fixed point, such as a hopper or a transportation or delivery position, and comprising in one of the voltage dividing circuits a plurality of manually preset voltage dividing means selectively controlled by switch positioning means, and wherein the preset voltage dividing means is matched against a voltage dividing means directly reflective of the accumulated weight or position of the delivered materials.

It is a further object of the present invention to provide, in one of its embodiments, a plurality of voltage dividing potentiometers mechanically coupled with compensating potentiometers for maintaining a fixed resistance in a comparative circuit portion, which circuit portion is arranged to be compared with a variable voltage dividing potentiometer directly relating to the movement of a device indicating accumulated weight or positioning of a plurality of materials transferred thereto.

It is still another object of the present invention to provide, in another embodiment thereof, a mechanical compensating means for providing an accumulative voltage division in one circuit of a comparative set of circuits for an automatic control for cumulative delivery of materials of a preselected weight or delivery position.

It is a still further object of the present invention to provide an electrical bridging circuit for indicating an unbalanced condition supplied to an amplifier between two comparative potentiometer circuits, in which one of said circuits includes a plurality of preset potentiometers selectively added to one branch of the bridging circuit for reflecting the said balanced or unbalanced condition.

It is still another object of the present invention to provide a clutching means for selectively establishing a comparative circuit for indicating a balanced or unbalanced condition for purposes of providing a signal to a signal amplifier for the delivery control of a plurality of materials for establishing a fixed accumulative weight or delivery position thereof.

Heretofore, in the case of weighing or transporting a variety of materials which are ultimately accumulated in a single weigh hopper or at a preestablished fixed delivery point, the devices used in controlling the amounts required an operator to mentally calculate the amounts to be delivered at the ultimate point or hopper, which was, in the case of weighing materials, reflected in a single scale mechanically coupled with the hopper. Obviously, this required the attention of semi-skilled personnel, and even in cases where skilled personnel were present, the operation often permitted situations where various errors in calculation were introduced.

It will be apparent, that in the case of weighing ingredients for the preparation of concrete for highway paving, for instance, that extensive tests and preestablished conditions have been scientifically set forth by engineers and persons professionally skilled in determining strength and other factors of the finished and cured concrete, which factors are directly proportional to the amounts of cement, aggregate and sand and water to be included in the initial mix. However, the final results of the mix are ultimately placed in the hands of the person in charge of making the delivery of the raw materials. In many cases, these persons are unskilled laborers, who ordinarily will not take the time, nor have the inclination, to provide exact weights of raw materials fed to the mixer.

The present invention is primarily directed to the automatic compilation of proper, preselected weights or relative positioning of materials without undue calculations of weights or distances being required of the operator placed in charge of dispensing the raw materials to be transferred to a common receiving means, such as a weigh hopper, or to be moved to a particular delivery point. Previous installations have often required the setting of circuit comparative means, such as potentiometers, by first setting one potentiometer relating to, for instance, sand at a desired value, and then requiring the operator to first account for the amount previously fed to the hopper and to mentally add to this amount the amount of another material, such as aggregate. This requires no particular effort in the case of easily added numbers such as 100 pounds and 100 pounds, respectively, but in instances where the figures might end in numbers other than zero, the calculations require extra attention.

In installations embodying the present invention, however, the circuitry for controlling the amount of material to be discharged, permits the operator to merely select preset amounts on individual dials relating to the respective materials, without requiring him to do any more than just that. The integrating electrical circuitry automatically calculates the additions for him.

The invention further consists in the several features hereinafter set forth and more particularly defined by claims at the conclusion hereof.

In the drawings:

FIG. 1 is a schematic circuit diagram of one embodiment of the control circuit of the present invention associated with diagrammatically illustrated components of a material delivery apparatus;

FIGS. 2–4, inclusive, are each portions of a schematic circuit diagram of other embodiments of the control circuit of the present invention, and which portions may be read in combination with a portion of FIG. 1 which is equally applicable to all embodiments of the invention and is illustrative of the material delivery apparatus and the circuit components associated therewith.

Referring first to the embodiment of FIG. 1, it will be observed that the improved control, in one of its applications, may function to automatically control the delivery of preselected amounts of a plurality of materials, as for instance, material A and material B contained in individual storage bins 10 and 11, respectively. A typical application of the invention may reside in the automatic control and delivery of preselected weights of sand and aggregate for use in the preparation of concrete at either a permanent site or, in the instance of highway paving, from temporary installations set up near the point of use. The storage bins 10 and 11 are conventional and permit the respective materials to be gravity discharged through a bottom discharge opening 12. A suitable gate 13 normally closes the discharge opening 12 to respectively retain the materials A and B in the bins 10 and 11.

The gate 13 of each of the bins 10 and 11 is of a conventional jaw type having a pair of channel-shaped members pivotally secured to the walls of the discharge opening 12. The jaws of the gate 13 are normally disposed immediately below the opening 12 and are laterally swung from underneath the discharge opening to allow the respective material to fall freely from the bin to a weighing hopper 14. The weighing hopper 14 is supported beneath the discharge opening 12 of each of the hoppers 10 and 11 and is arranged to receive the free-falling column of material therein. The hopper 14 is coupled to a suitable scale 15 by conventional means diagrammatically illustrated herein. The scale is arranged to indicate the cumulative weight of materials A and B disposed in hopper 14.

A discharge opening 18 having a jaw-type gate 19, similar to the gates 13 of the bins 10 and 11, is provided in the bottom of the weigh hopper 14 to deliver the preselected quantity of materials A and B from the hopper 14 to any suitable transporting device, not shown, such as a conveyor belt, truck or the like.

Inasmuch as the control circuit portion, generally referred to by the reference character I, may be used as shown for purposes of illustrating each of the various embodiments, it will be understood that the embodiments of the invention illustrated in the views of FIGS. 2–4 may be substituted for the circuit portion indicated by the reference character II of FIG. 1 in the descriptions thereof to follow. Thus, each of the various control circuit embodiments may be interposed in the circuit for automatic operation of the delivery control portion I by means of respective banks of a conventional step switch CRS which may be controlled by a rotary solenoid or other means shown diagrammatically herein. Circuit portion I includes banks CRS-1 and CRS-2 of the stepping switch CRS, along with conventional "homing" contacts 20. Power is supplied by incoming lines 21 and 22 controlled by a master switch 23 and provided with usual circuit protecting fuses 24 and 25. Thus, it will be apparent from FIG. 1 that banks CRS-1 and CRS-2, respectively control, through their contacts, various means for actuating the jaws or gates 13 and 19 of the bins 10 and 11 and the weigh hopper 14, respectively. The manually operated start switch 30 and hopper discharge switch 31 respectively control the operation of the control circuit and the final discharge of the contents from the weigh hopper 14, as will hereinafter be described. Thus, on completion of the circuit from line conductor 21 through the movable contact 32 of bank CRS-1, when in its second operating position engaging stationary contact 33, and thence to conductor 34, the coil of solenoid 35 will be energized as the circuit permits its plunger to open the discharge gate 13 of the bin 10. The conductor 36 is connected to the coil of solenoid 37 to actuate its plunger controlling the discharge gate 13 of the bin 11, and the circuit is completed from the coil of solenoid 37 to the power line 22 on movement of contact 32 to its third position to engage stationary contact 38. Conductor 39 terminating in the contact 40 of bank CRS-1 of the stepping switch completes its circuit to the power line 22 through the coil of solenoid 41 controlling opening operation of the discharge gate 19 of the weigh hopper 14. The sequential operation of the various actuating solenoids or other means for opening the gates will later be described.

Bank CRS-2 of the stepping switch will next be described, and it will be observed that this bank is connected with the power line 21 by means of the branch conductor 49 and includes a movable contact 50 arranged for engagement with stationary contacts 51, 52, 53 and 54, of which contacts 52 and 53 are electrically connected to one another by means of bridging connector 55. Contact 51 is normally connected at the initial or start position of contact 50, with the normally open, momentary, manually controlled, start button 30 interposed in the conductor 57. The contact 54, which is engaged by movable contact 50 on the fourth step position of the switch CRS, is connected to the normally open contact 56 of the relay CR by means of conductor 59. Both the conductors 57 and 59 are arranged to complete the circuit from the power line 21 to the homing contacts 20, through the branch circuit 60. The homing contacts 20 are conventionally supplied with stepping switches of the type disclosed herein to break the circuit between each stepping position for purposes of permitting the switch operating mechanism, such as a solenoid plunger, to return to its normal "home" position.

Normally closed contacts 61 of the relay CR are also connected to the operating element of the stepping switch CRS by means of the branch 60 and the conductor 62 terminating in the bank CRS-2 contact 53, which will be recalled is also in circuit connection with contact 52 by means of the bridging conductor 55. The sensing control portion II of the circuit of FIG. 1 includes a group of voltage dividing potentiometers arranged to divide a D.C. circuit supplied from a transformer 70 having its primary winding 71 to the power input conductors 21 and 22 and including a secondary winding 72 supplying a D.C. rectifier 73. A secondary winding 74 provides power input to the signal amplifier 75. The D.C. supply is provided from conductors 76 and 77 oppositely connected to the rectifier 73.

The sensing circuit portion II further includes a scale potentiometer 80 which is mechanically coupled to the dial of the scale 15 and arranged to have its movable contact member 81 rotate in corresponding relationship with the dial of the scale 15. It is conceivable that a linearly movable potentoimeter may be utilized and arranged to have its contact move over a proportionate portion of the winding corresponding to the movement of the scale dial or other indicating scale means (not shown). The mechanical coupling between the scale 15 and potentiometer contact 81 is not specifically shown, but it is conceivable that the movable contact 81 may be in direct coaxial relationship with a common laterally extending rotatable axle on the scale indicator or indirectly motivated by a servo device. The movable contact 81 is electrically connected to one side of the signal amplifier 75 by means of the conductor 82. A compensating resistor R is provided, when desired. Preset potentiometers 83 and 84 are provided which are preferably mechanically coupled with compensating potentiometers 85 and 86, respectively, and are arranged to be connected across the D.C. supply circuit conductors 76 and 77 by means of a branch line 87 connecting conductor 76 with potentiometer 83, branch conductor 88 connecting the moving contact 89 of preset potentiometer 83 with the preset potentiometer 84, branch conductor 90 connected to the moving contact 91 of preset potentiometer 84, the moving contact 92 of the compensating potentiometer 85, the winding of compensating potentiometer 86, branch conductor 93, the moving contact 94 of compensating potentiometer 85, to complete the circuit to conductor 77 by means of the winding of compensating potentiometer 85 and branch conductor 95.

The moving contact 89 of the preset potentiometer 83 (which potentiometer relates to material A) is electrically connected to the stationary contact 97 of the CRS-3 bank of the stepping switch CRS, which also includes stationary contacts 96, 97, 98 and 99. The connection between movable contact 89 of potentiometer 83 and the contact 97 is made via branch conductor 100, whereas another circuit is completed from movable contact 91 of preset potentiometer 84 to contact 98 by means of branch conductor 101. Preset potentiometer 84 relates to material B, as will hereinafter be described. Contact 99 of bank CRS-3 is connected with the moving contact 102 of a zero sensing potentiometer 103 by means of branch conductor 104. The potentiometer 103 is arranged to divide the circuit between conductors 76 and 77 and includes a compensating resistance 104a. The movable contact 105 of bank CRS-3 is directly connected to the signal amplifier 75 by means of branch conductor 106. The signal amplifier is arranged to amplify signals received from the conductors 82 and 106, sensing an unbalanced condition between the scale potentiometer 80 and the circuits completed by the respective positions of contact 105 of bank CRS-3. The signal received by the amplifier is amplified and fed to conductors 107 and 108, which supply the coil 109 of the sensing relay CR.

Operation of the circuit components of the embodiment of FIG. 1 will next be explained. Initially, it is to be assumed that the scale 15 and scale potentiometer contact 81 are at zero reading, and that the material A preset potentiometer 83 has been manually set at an assumed position of 200 lbs., and the material B preset potentiometer contact 91 position is also set at an assumed value of 200 lbs., to provide a total weight of 400 lbs. on the scale 15 at the conclusion of batching procedures. The movable contacts 89 and 91 of preset potentiometers 83 and 84, respectively, are manually controlled by the operator and conventional indicator dials (not shown) are generally provided for purposes of registering the desired preset position. As before stated, the stepping switch CRS is preferably solenoid actuated and includes the normally closed "homing" contact 20 and the three banks CRS-1, CRS-2 and CRS-3 having four contacts apiece. The moving contact of each of the respective stepping switch banks is ganged to operate concurrently with the other contacts or in otherwise fixed relationship with the respective moving contact of the other two banks.

Initially, we will assume for illustrative purposes that the step switch CRS is in its start position with the moving contact 32 of bank CRS-1 being positioned relative to an unconnected contact, whereas the moving contact 50 of CRS-2 is in its first position connecting the power line 21, through the branch 50, to the stationary contact 51, to thereby supply power to the conductor 57 upon manual closure of the switch 30. The moving contact 105, in its start position relative to contact 96, does not supply any circuits through its first contact.

When an operator readies the control circuit for operation, upon closing the master switch 23, he is then ready to start the delivery of the preselected amounts of material A and B (assumed to be at a position of 200 lbs. in each case) by depressing the momentary start button 30. This operation completes the circuit, and power is supplied to the operating coil of switch CRS, causing the step switch to step to the second operating position. Thus, the moving contact 50 of bank CRS-2 in stepping from the first position to the second position breaks its circuit with contact 51 to inactivate the start button 30. While in the second position it will be noticed that a circuit is completed on bank CRS-2 through contact 52 to the normally closed contact 61 of relay CR to the CRS coil, but because of the inherent delay in the operation of the step switch, the following steps take place before the step switch can step. First, since the moving contact 105 of bank CRS-3 has also moved to its second position, it will now pick up the material A preset potentiometer 83 through conductor 100, which potentiometer has been preset at a desired value of 200 lbs., and the scale 15 and its potentiometer contact 81, at this moment will be at a zero reading. It will be observed, therefore, that the signal amplifier 75 will sense an unbalanced voltage. This unbalanced voltage is amplified to conductors 107 and 108 resulting in the energization of coil 109 of the sensing relay CR. Thus, the normally closed contact 61 will now open to thereby prevent the step switch CRS from stepping out of its second position until the CR contact 61 is again closed. It will also be apparent that the bank CRS-1 movable contact 32 is also in the second position at this movement, permitting power from conductor 21 to reach the coil of solenoid 35 of the material A batch gate 13, resulting in the opening of this gate. Material will now flow from the overhead bin 10 into the weigh hopper 14, causing the scale to begin to deflect. As the weight of material builds up in the weigh hopper 14, the scale 15 will register the weight, and upon reaching an indication of 200 lbs., (such indication having been previously set on the preset potentiometer 83), a "zero" signal will be received by the signal amplifier 75, and the sensing relay CR will drop out and remain in the dropped out position with contact 61 being returned to its normally closed position.

At this time, a circuit will also be completed from the second position of the bank CRS-2, via contact 52 and conductor 62 through the now closed contact 61 to the coil of step switch CRS, allowing power to remain on the step switch coil until the step switch can position the three banks of contacts to their third position. In the third position it will be apparent that the moving contact 105 of bank CRS-3 picks up the preset potentiometer 84 on engagement with contact 98 and conductor 101. The contact 50 of bank CRS-2 will again pick up the circuit including the normally closed contact 61 of relay CR through the conductor 62, and bank CRS-1 contact 32 picks up and energiezs the coil of batch gate solenoid 37 for gate 13 of bin 11, holding material B. Since the preset potentiometer 84 has been previously set at a value of 200 lbs., the first impression will be that the circuit will remain at balance, but further observation will indicate that the resistance in the preset potentiometer 84 is in series with the resistance in the preset potentiometer 83 through branch 88. Thus, while the preset potentiometer 84 registers 200 lbs. on its dial, the amount of series resistance is actually equivalent to a value of 400 lbs. Therefore, with the scale previously having stopped at 200 lbs., there now remains an unbalance differentiation of 200 between the position of the scale 15 and its potentiometer 80 and the electrical position of the preset potentiometer 84. Thus, with this unbalance existing the unbalance will again be amplified by the signal amplifier 75, which in turn energizes the sensing relay CR, causing the normally closed contacts 61 to again open before the step switch CRS can step out of its third position. Material will now flow out of the material B batch gate 13 and the scale 15 attached to the weigh hopper will increase in its registration until an indication of 400 lbs. is reached. At this point the electrical balance again will occur where there will be a zero signal fed to the signal amplifier 75, allowing the sensing relay CR to deenergize and the normally closed contact 61 to again close. The contacts again remain closed sufficiently long for the step switch CRS to step from the third position to the fourth position.

In the fourth position the contact 105 of bank CRS-3 will pick up a so-called "zero sensing" potentiometer 103 which is present and always remains at the preset position to sense a zero balance when the scale is at zero. Therefore, since our scale registers well above the point for zero signal to be fed into the amplifier 75, the sensing relay CR must, by necessity, remain in its dropped off position until the scale reaches the zero weight point to permit this relay to pick up. Parenthetically, the differential signal fed into the signal amplifier 75 that is resulting between the scale and the zero sensing potentiometer 103 is in effect a negative signal which cannot be amplified. Therefore, the bank CRS-2 contact 54 is in series with a normally open contact 56 of relay CR providing an interrupted circuit to switch CRS. It will now be apparent that when CRS-1 contact 32 is in the fourth position contacting contact 40, manual depression of the discharge button 31, will cause the discharge gate 19 of weigh hopper 14 to be opened by means of the actuator of solenoid 41, and the material in the weigh hopper 14 may be discharged at will.

As the material in the hopper 14 is discharged, the scale 15 will decrease in its registration until the weight hopper 14 becomes empty and the scale 15 registers zero. The zero sensing potentiometer 103 having been set so that when the scale 15 is at zero, there will be just sufficiently unbalanced differential between the scale potentiometer 80 circuit and the zero potentiometer 103 circuit for the sensing relay CR to be energized. Thus, the sensing relay CR picks up its contact 56, completing the circuit through the fourth position of the bank CRS-2 to the coil of step switch CRS, causing the step switch to step on through one more step on the start position. The cycle may now be again started as described above at the wall of the operator.

As stated previously, the circuit including the preset potentiometers 83 and 84 also includes compensating potentiometers 86 and 85 which are respectively mechanically coupled with potentiometers 83 and 84. It will be noted that the moving contacts 92 and 94 are arranged to cancel out the resistance introduced by the relative positioning of the coupled contacts 89 and 91 contacting the respective coils of potentiometers 83 and 84. Thus, no matter when the preset contacts 89 and 91 may be positioned, the effect will be to maintain the same amount of resistance in the voltage divided circuit between conductors 76 and 77.

The embodiment of FIG. 2 will next be described and it will be apparent that the schematic portion illustrated is equivalent to the portion II of FIG. 1 and may be read in conjunction with the diagrammatic portion I of that figure. It will first be noted that there is again provided two separate and individually adjustable preset potentiometers 110 and 111, both arranged to divide the circuit between the D.C. conductors 76 and 77.

Like reference numerals will be used throughout the description to indicate like parts in the various embodiments.

The preset potentiometer 110 is related to the delivery of material A and potentiometer 111 may be set for predetermined delivery of material B. The circuit to the signal amplifier 75 from preset potentiometer 110 is completed from its movable contact 112 to the branch conductor 113 connected to stationary contact 115 of bank CRS-3a, which also includes contacts 114, 115, 116 and 117. The movable contact 118 of preset potentiometer 111 completes its circuit through branch conductor 119 to the contact 116. A zero sensing potentiometer 103 is connected through its movable contact 102 to the bank contact 117 by means of the branch circuit 104. D.C. conductors 76 and 77 are bridged by the branch conductor 120 connected in series with the potentiometer 110, whereas branch conductor 121 includes potentiometer 111 and the zero sensing potentiometer 103 is connected across the conductors by means of branch circuit 122. In this case the end terminals of the respective coils of potentiometers 110 and 111 are connected in series with the conductors 120 and 121, respectively.

It will be observed that the embodiment of FIG. 2 includes mechanical compensating means in substitution for the compensating potentiometers 85 and 86 of the embodiment of FIG. 1, which means may comprise a bevelled drive gear 120 arranged to be mechanically coupled with the movable contact 112 of potentiometer 110, and manually rotatable by means of the hand wheel 121, which hand wheel may register the preselected amount upon an indicating dial (not shown), or other such means. For purposes which will later be apparent the beveled drive gear 120 is normally biased out of meshing contact with its driven beveled pinion 122 by means of a spring 123 circumjacent to axially slidable shaft 124, and stationarily held at its opposite end. The driven gear 122 is arranged to drive an oppositely disposed bevelled gear 122a which, in turn, mates with a bevelled pinion 125. The bevelled pinion 125 is axially mechanically coupled with the movable contact 118 of preset potentiometer 111. The potentiometer 111 may be preset by means of the manually operated hand wheel 126 connected to a bevelled drive gear 127 which is normally out of contact with its mating driven gear 128. The driven gear 127 is normally biased away from contact with driven gear 128 by spring means 129 and when in engagement with gear 128 acts to rotate beveled gear 128a which is also in mesh with pinion 125.

Thus, it will be apparent that each of the individual preset potentiometers 110 and 111 may be individually set by means of the hand dials 121 and 126, respectively.

The mechanical coupling arrangement of the preset potentiometers 110 and 111, in the present embodiment, provides a means for automatically tying in the two potentiometers without requiring dual matched units illustrated in connection with the first described embodiment. Thus, because of the direct coupling between the gears 122, 122a, 125, 128a and 128 of the gear train, manual rotation, and pressure against the bias of spring 123, of the hand wheel 121 will cause drive gear 120 to mesh with driven gear 122 to provide concurrent movement of the movable contacts 112 and 118 of the potentiometers 110 and 111, respectively. If it is assumed, as in the case of the first embodiment, that the movable contact 112 of potentiometer 110, is set at an arbitrary 200 lbs. of material A, the contact 118 will also be caused to move a comparable distance, signified by the dotted line position, on the winding of the preset potentiometer 111 as the pinion 125, mechanically coupled thereto, is concurrently rotated during manipulation of the hand wheel 121. This will add an equal number of coil turns in each preset potentiometer.

To preset the potentiometer 111, relating to material B, the hand wheel 126 is then pressed inwardly against the bias of its spring 129 and rotated to an assumed position of 200 lbs. It will be observed that movement of the hand wheel 126 will have no effect on the position of the movable contact 112 of potentiometer 110, as the gear 120 will be out of contact with the gear 122.

Thus, one or the other of the potentiometers 110 or 111 may be left at zero position if only one of the materials A or B is desired.

It will be apparent that in each of the steps of the step switch CRS, such as those previously described in connection with the first described embodiment, that the voltage division in the respective preset potentiometers 110 and 111 will be balanced against the scale potentiometer 80 contact 81 position. That is, when the step switch CRS has been actuated to motivate the movable contact 123 of the bank CRS-3a to its second position, in contact with the stationary contact 115, there will be an unbalanced signal to the signal amplifier 75 until the contact 81 of the scale potentiometer 80 has been moved concurrently with the dial of the scale 15 to a relative position indicating 200 lbs. of the discharged material A. When the movable contact 123 has been actuated to its third position, in contact with 116, the voltage comparison will be made from conductor 119 to the movble contact 118 of the preset potentiometer 111. Since the moving contact 118 of potentiometer 111 has been previously motivated, upon rotation of gear 122 responsive to manipulation of hand wheel 121, to the amount indicated by the dotted position on FIG. 2, the voltage unbalance will take into consideration the previously set amount of 200 lbs. now registering on the dial of scale 15 because of discharge of material A, and reflected on the scale potentiometer 80. Thus, the relative electrically unbalanced condition will be reflected between the dotted position of the movable contact 118 and its solid line preset position of 200 lbs. A balanced voltage condition will then exist when the movable contact 81 of the potentiometer 80 moves from its position established from the 200 lbs. from material A discharged to the hopper 14, to the new 200 lbs. weight position of material B preset as a limit on potentiometer 111.

Again, when the movable contact 123 of the bank CRS-3a moves to its fourth position, in contact with contact 117, the zero sensing potentiometer 103 will be brought into play, sensing an unbalance, to permit actuation of the solenoid 41 for opening of the discharge gates 19 of the hopper 14 upon manual closure of the switch 31 at the will of the operator.

Next, with reference to the embodiment of FIG. 3, this embodiment illustrates a further variation in the potentiometer circuit and incorporates a servo-mechanism drive for the so-called scale potentiometer. In the circuitry illustrated in FIG. 2, there is indicated two individual single preset type potentiometers 130 and 131 having movable contacts 132 and 133, respectively. These potentiometers respectively relate to the material A and material B. In the case of the present embodiment, a clutch driven potentiometer 135 is provided with its movable contact 136 actuated by means of a suitable clutch mechanism that is adapted to position itself in direct relationship to the position of the dial of the scale 15. Also driven by this servo-mechanism is a so-called reference potentiometer 137 having its movable contact member 138 coupled directly to the scale pointer shaft 139 in order that its position directly reflects that of the scale pointer. A suitable gear train 140 may be provided for providing the direct power through some means, such as a right angled drive, indicated diagrammatically at 141 for the reference potentiometer 137 and for supplying power to a clutch means 142. Power to the gear train 140 is supplied from a drive shaft 139, which may be connected directly to the shaft of the scale dial or, as shown, which may be empowered by means of a servo-receiver 143 of conventional design receiving a power signal from an amplifier 144 which, in turn, receives its signal from a conventional servo-transmitter 145.

The engaged element of the clutch 142 is preferably spring biased in a preferred direction by means such as a torsion spring 146 and also includes a stop means 147 for maintaining the driven clutch member in a preferred "home" position, with the contact 136 of the potentiometer 135 at zero position.

The clutch driven potentiometer 135 is inserted between the D.C. power supply conductors 76 and 77 and connected thereto by means of a branch conductor 150, whereas the potentiometers 130 and 131 are connected across the lines by means of conductors 151 and 152, respectively. A zero sensing potentiometer 103 is again supplied and connected in the usual manner. The movable contact 138 of the reference potentiometer 137 is connected by means of branch conductor 153 to the fourth position stationary contact 154 of a stepping switch bank CRS-3b. The bank CRS-3b also includes a moving contact 155 and additional stationary contacts 156, 157 and 158. The contacts 157 and 158 are electrically bridged by means of a conductor 159, both the contacts 157 and 158, representing the second and third position of the movable contact 136 by means of conductor 160.

An additional bank CRS-4b is provided for the step switch CRS in this case and comprises a movable contact 165 and four stationary contacts 166, 167, 168 and 169. The contact 167 representing the second position of bank CRS-4b is connected to the moving contact 132 of the preset potentiometer 130 by means of a conductor 170, whereas the contact 168 is connected with the moving contact 133 of the potentiometer 131 by means of conductor 171. The fourth position contact 169 of bank CRS-4b is connected in the usual manner with the movable conductor 102 of the zero sensing potentiometer 103 by means of the previously described conductor 104.

Both of the preset potentiometers 130 and 131 for materials A and B, respectively, are set for the specific weights of the material that are required in the weigh hopper 14. Therefore, if the preset potentiometer 130 is assumed to be set for 200 lbs. of material A and the preset potentiometer 131 has its contact set for an assumed position of 200 lbs. of material B, the following sequence will take place.

As the start button 30 (see FIG. 1) is closed, the step switch CRS will move as previously described, to its second operating position to thereby close the circuit to the preset potentiometer 130 through conductor 170, contact 167, movable contact 165 and conductor 172 to the signal amplifier 75. Simultaneously, the circuit to the clutch driven potentiometer 135 will also be closed through conductor 160, contact 158, bridging conductor 159 and contact 157 of the bank CRS-3b, then engaged by the movable contact 155. Contact 155 is connected to the signal amplifier 75 by means of conductor 173.

Another circuit, which is conventional, merely supplies power from the signal amplifier 75 through conductors 174 and 175 to the electrically driven clutch 142, which circuit is also picked up at this time. Thus, as the material A flows from its hopper 10 into the weigh hopper 14, the scale 15 will indicate the weight and supply power to the clutch 142 (now engaged responsive to the amplifier 75 signal output) to the clutch driven potentiometer 135, which will respond in proportion to the amount of material A discharged, until the material reaches the assumed value of 200 lbs. preset on potentiometer 130. A balanced signal will then be received by the signal amplifier 75. This will cause the stepping switch CRS to switch to its third position in its various banks, and the clutch 142 will concurrently be momentarily deenergized. Upon deenergization of the clutch 142, the potentiometer 135 will be reset to zero position by means of the spring 146 and with the stop 147 resting in its "home" or rest position, as shown.

Next, with the bank CRS-4b in the third position, with its movable contact 165 engaging stationary contact 168, the preset potentiometer 131 will be picked up to provide discharge of material B. Again the clutch driven potentiometer 135 will start from its zero position, even though the dial of the scale 15 is registering 200 lbs. (because of the previous weighing of discharged material A), because of disengagement of clutch 142. We will again weigh out the assumed preset 200 lbs. of material B; that is, until the clutch driven potentiometer 135 again reaches the electrical balance point, at which time the step switch CRS will be caused to switch into its fourth or discharge position, as previously described. The discharge switch 31 (see FIG. 1) may now be depressed to release the material from weigh hopper 14.

It is possible under the present embodiment to provide an automatic tare compensation to provide for any sort of weigh hopper. The hopper may be in the form of a truck or any receptacle resting on the scale 75 with unknown tare weight. The scale dial can read at any point, but the clutch driven potentiometer 135 will always start at zero, assuring the correct final weight in the receptacle.

Referring next to the embodiment of FIG. 4, it will be apparent that the invention may take the form of an electrical bridging circuit. That is, the main power supply is provided in the usual fashion from conductors 21 and 22 to the primary winding 71 of transformer 70. The D.C. circuit supply is provided again by means of the rectifier 73, and the signal amplifier 75 receives its power from the secondary winding 74 of the transformer 70, as previously described. Thus, a bridged circuit is established between the junctions 180, 181, 182 and 183, junctions 181 and 183 being connected directly to the D.C. circuit conductors 76 and 77 originating from the rectifier 73. An unbalanced circuit condition will then be reflected in a signal to the signal amplifier 75 between points 180 and 182 and the respective conductors 184 and 185 terminating in the amplifier 75. A fixed resistance is provided in the conventional manner for bridging circuits, in the form of resistor 186 between the junctions 180 and 181, as is another resistor 187 provided in the bridge circuit between junctions 181 and 182. Again, a scale potentiometer 188 has its moving contact 189 mechanically coupled with the dial of the scale 15 and arranged to move correspondingly with that dial. Preset potentiometers 190 and 191, having moving contacts 192 and 193, are provided in one branch of the bridge between junctions 180 and 183 and relate to materials A and B, respectively. These potentiometers are manually set as described in connection with previous embodiments. An alternate bridging circuit between junctions 180 and 183 includes a zero sensing potentiometer 194 having a moving contact 195.

The present embodiment includes stepping switch CRS contact banks CRS-3c and CRS-4c, in addition to the banks CRS-1 and CRS-2 illustrated in the circuit portion I of FIG. 1. The bank CRS-3c includes a movable contact 196 engageable with the stationary contacts 197, 198, the remaining contacts relating to the third and fourth stepping positions not being used herein. The movable contact 200 of bank CRS-4c is arranged to electrically engage the stationary contacts 201, 202, 203 and 204. The contacts 202 and 203 are connected with one another by means of the bridging conductor 205. The movable contact 200 of bank CRS-4c is electrically connected to the junction 180 by means of a branch conductor 210 and is arranged to selectively complete the circuit between junctions 180 and 183 in conjunction with the bank CRS-3c contacts, as will later be described. Contact 203 is also connected to a terminal 211 by means of conductor 212. The stationary contact 204 is connected to the alternate bridging circuit between junctions 180 and 183 including the movable contact 195 of the zero sensing potentiometer 194, by means of conductor 213.

The movable conductor 196 of bank CRS-3c is connected, by means of conductor 214 to one side of the presetting potentiometer 191 and is arranged to by-pass this potentiometer when moved to its second position in engagement with stationary contact 198. Contact 198 is connected to the opposite side of potentiometer 191 by means of conductor 215. Both potentiometers 190 and 191 have one end of their windings free of electrical connection. There are no connections to the contacts relating to the third and fourth positions of the bank CRS-3c movable contact 196. The opposite D.C. supply conductor 77 originating from the rectifier 73 is connected to the point 181 of the bridging circuit.

It will be apparent that any unbalance in the bridging circuit reflected between the junctions 180 and 182 will be reflected in a signal to the signal amplifier 75, which accordingly will supply amplified current in the usual manner to the coil 109 of the relay CR by means of conductors 107 and 108. The switch CRS will operate in the manner previously described in connection with the embodiment of FIG. 1. Thus, with an assumed preset value of 200 lbs. of material A to be discharged, as established, by manual adjustment of the movable contact 192 of the preset potentiometer 190, and a preset amount of 200 lbs. of material B established on the preset potentiometer 191, it will be apparent that when the movable contact 200 of bank CRS-4c is stepped to its second position, the circuit between junctions 180 and 183 will be completed. This circuit includes junction 180, conductor 210, contacts 200 and 202, connector 205, contact 203, conductor 212 and terminal 211. Inasmuch as contact 196 of bank CRS-3c has also been concurrently stepped to its second position in engagement with contact 198, a bypass circuit will thereby be provided around the preset potentiometer 191 through conductors 214 and 215. It will then be seen that the branch circuit between junctions 180 and 183 will take the path through preset potentiometer 190 for determining the preset amount of material A to be delivered and as the material A is discharged from the bin 10, the dial of scale 15 will be caused to move and thereby concurrently move the movable contact 189 of the scale potentiometer 188 to reflect an unbalanced condition in the circuit between the points 180 and 182. The unbalanced signal will then be received by the amplifier 75 and the several ensuing actions will take place in the circuit portion I, as previously described in connection with the embodiment of FIG. 1. A balanced circuit condition will be reached when the contact 189 matches the preset position of the contact 192 of the potentiometer 190, relating to material A.

As the movable contacts 196 and 200 of banks CRS-3c and CRS-4c are caused to step to their third position, respectively, it will be apparent that the circuits to the conductors 214 and 215 will each be interrupted. This actuator will permit current to now be supplied through the preset potentiometer 191, and the resistance of the potentiometer 191 will thereby be added to that of potentiometer 190. The dial of the scale 15 will have remained at its position indicating 200 lbs. of material A, and accordingly, the contact 189 of the scale potentiometer 188 will also reflect this position. As the movable contact 200 is now at its third position in engagement with stationary contact 203, the circuit will be completed from junction 180 to the terminal 211 through conductor 210, contact 200, contact 203 and conductor 212. Now, however, an unbalanced circuit relationship will again be established as the circuit includes the preset amount indicated by the contact 193 of preset potentiometer 191, relating to material B.

As material B is discharged from its bin 11, the dial of scale 15 will again be caused to move from the 200 lb. position previously established by discharge of material A, and will accordingly, cause the movable contact 189 to move from its former position, relative to previously-discharged material A, to a position representing the total resistive circuit of potentiometers 190 and 191 in the branch between junctions 180 and 183. Upon reaching the assumed preset position of 200 lbs. of material B, a balanced signal will again be received by the signal amplifier 75 to thereby cause the discharge gate 13 of bin 11 to close and to further cause the stepping switch to be motivated to its fourth position, as previously described, and place the movable contact of bank CRS-4c in engagement with stationary contact 204. This will now complete the circuit from junction 180 through conductor 210, movable contact 200, contact 203, conductor 213 through the alternate circuit of the zero sensing potentiometer 194 to be completed to the junction 183. The unbalanced circuit condition reflected through the alternate circuit of the zero sensing potentiometer 194 will then permit the solenoid 41 to be actuated upon the manual depression of the discharge switch 31 to open the gate 19 of the hopper 14 at the will of the operator.

It will be apparent that tare weight compensation may be provided for the embodiment of FIG. 4 by the use of means such as the clutch driven potentiometer illustrated in FIG. 3 (not shown) should it be so desired to incorporate this feature.

The term "switch means" has been used throughout the specification and claims herein and has been featured more specifically as a conventional stepping switch. The term, however, is to be considered in its broad sense to incorporate other forms of sequentially operated switching devices and remain within the scope of the present invention.

It will be apparent that in each of the embodiments hereinabove described, that circuit relationships have been set up for merely two different materials A and B for purposes of simplicity of description and illustration. However, it will be apparent to those skilled in the art that additional circuits respectively relating to additional materials may be added as desired without departing from the scope of the present invention. It will also be apparent that in each of the embodiments of the present invention, either or both of the respective preset potentiometers may be motivated to any desired amount, and may conclude a zero amount of the respective material, if so desired, without affecting any relationship of the other preset potentiometer or potentiometers.

We claim:

1. An automatic control for delivery of materials from a plurality of bulk sources to a common receiving means, comprising an integrating electrical circuit arranged for connection with a source of electrical energy, and including comparative circuit portions, condition responsive means associated with said circuit portions and arranged to respond to an unbalanced circuit condition existing therebetween; one of siad circuit portions being a material receiving responsive portion including means for altering said portion in proportion to the accumulated amount of material delivered to said receiving means, and another of said comparative circuit portions being a preset portion including adjustable means for cumulatively altering that portion responsive to a preselective delivery of respective materials from said bulk sources; sequentially operated movable switch means arranged to be selectively moved to one of several switch contact positions responsive to an unbalanced circuit condition existing between said comparative circuit portions as reflected in said condition responsive means; electrically operated delivery control means for each of said bulk material sources and arranged to be selectively operated for delivery of the respective material to said receiving means on motivation of said movable switch means to a respectively associated switch position, whereby the said comparative circuit portions will automatically integrate the accumulated responsive condition to said condition response means for movement of said switch to its next succeeding switch contact positions for actuation of the respective delivery control means associated with the remaining bulk sources, a presettable zero sensing potentiometer circuit, and means to connect said zero sensing potentiometer circuit in a comparative circuit relation to the circuit portion being the material receiving responsive portion and arranged to provide an unbalanced signal to said amplifier upon removal of said materials from said common receiving means for purposes of resetting the cyclic operation of said switch means.

2. The automatic control of claim 1 having said presettable zero sensing potentiometer circuit selectively connected in circuit by said selectively movable switch means and thereafter holding the selectively movable switch means effectively inoperable prior to discharge of said materials from said common receiving means, and means to release the material from said common receiving means and thereby reset said switch means for another delivery of material.

3. An automatic control for delivery of materials from a plurality of bulk sources to a common receiving means, comprising an integrating electrical circuit arranged for connection with a source of electrical energy, and including an electrical bridge having four arm portions of which two arm portions each have a fixed resistance, a reference potentiometer circuit portion comprising a third arm portion of said bridge and having a movable contact arranged to be motivated directly responsive to the accumulated amount of material delivered to said receiving means, the fourth arm portion of said bridge comprising a comparative circuit portion including a plurality of manually presettable potentiometers respectively associated with each of said material bulk sources and each being arranged for establishing a predetermined balancing voltage division responsive to predetermined delivery of a respective material; a signal amplifier arranged to provide an amplified output circuit responsive to an unbalanced signal voltage condition between the said comparative third and fourth arm portions of said bridge; selectively movable switch means arranged to be selectively motivated to one of several switch contact positions responsive to an amplified output signal from said amplifier upon the occurrence of a balanced circuit condition existing between said comparative arm portions; and electrically operated delivery control means for each of said bulk material sources and arranged to be selectively operated for delivery of the respective material to said common receiving means upon motivation of said movable switch means to a respectively associated switch position, whereby the said preset potentiometer arm portions of the bridge and reference arm portion will automatically integrate the accumulated input voltage signal to said amplifier for movement of said switch to its next succeeding switch contact positions for actuation of the respective delivery control means associated with the remaining bulk sources.

4. In an automatic control for delivery of materials from a plurality of bulk sources to a common receiving means, a bridge circuit connectable to a power source and having a preset arm and a delivery responsive arm, said delivery responsive arm including a potentiometer having a movable contact means coupled to the receiving means and positioned in accordance with the material received therein, said preset arm including a plurality of series connectable preset potentiometers having separably movable contact means for positioning in accordance with the separate quantity of material to be delivered from the bulk sources, said preset arm further including a discharge sensing potentiometer having a movable contact means, and a stepping switch having a first switch bank to sequentially operably connect the series connectable preset potentiometer in the bridge circuit and thereafter the discharge sensing potentiometer and having a second switch bank operated concurrently with said first switch bank to sequentially insert the several potentiometers in said series of preset potentiometers, and means operated by the output of the bridge circuit to control delivery of material from the bulk sources in accordance with the output of the bridge circuit and to actuate said stepping switch to automatically deliver material from said bulk sources in accordance with the separate settings of said preset potentiometers and to reset the stepping switch in response to discharge of material from the common receiving means.

5. The construction of claim 4 wherein said last named means includes a third switch bank of said stepping switch operated concurrently with the other switch banks, said third switch bank being connected to sequentially disenable all delivery from the bulk sources, separately enable delivery from the bulk sources, and finally enable discharge from the common receiving means, and electro-responsive means connected to the output of said bridge circuit to sequentially actuate the stepping switch.

References Cited in the file of this patent

UNITED STATES PATENTS

| | | |
|---|---|---|
| 2,046,693 | McCrery | July 7, 1936 |
| 2,343,000 | Carliss | Feb. 29, 1944 |
| 2,801,819 | Lindars | Aug. 6, 1957 |
| 2,829,828 | Hollenbach | Apr. 8, 1958 |
| 2,871,006 | Hags | Jan. 27, 1959 |
| 2,872,807 | Kolisch | Feb. 10, 1959 |
| 2,918,246 | Bell | Dec. 22, 1959 |
| 2,938,701 | Thorsson | May 31, 1960 |
| 3,004,617 | Burdick | Oct. 17, 1961 |
| 3,035,648 | Williams | May 22, 1962 |